(No Model.)
J. D. DARLING.
MODE OF PRODUCING NITRIC ACID AND METALS FROM NITRATES.
No. 517,001. Patented Mar. 20, 1894.
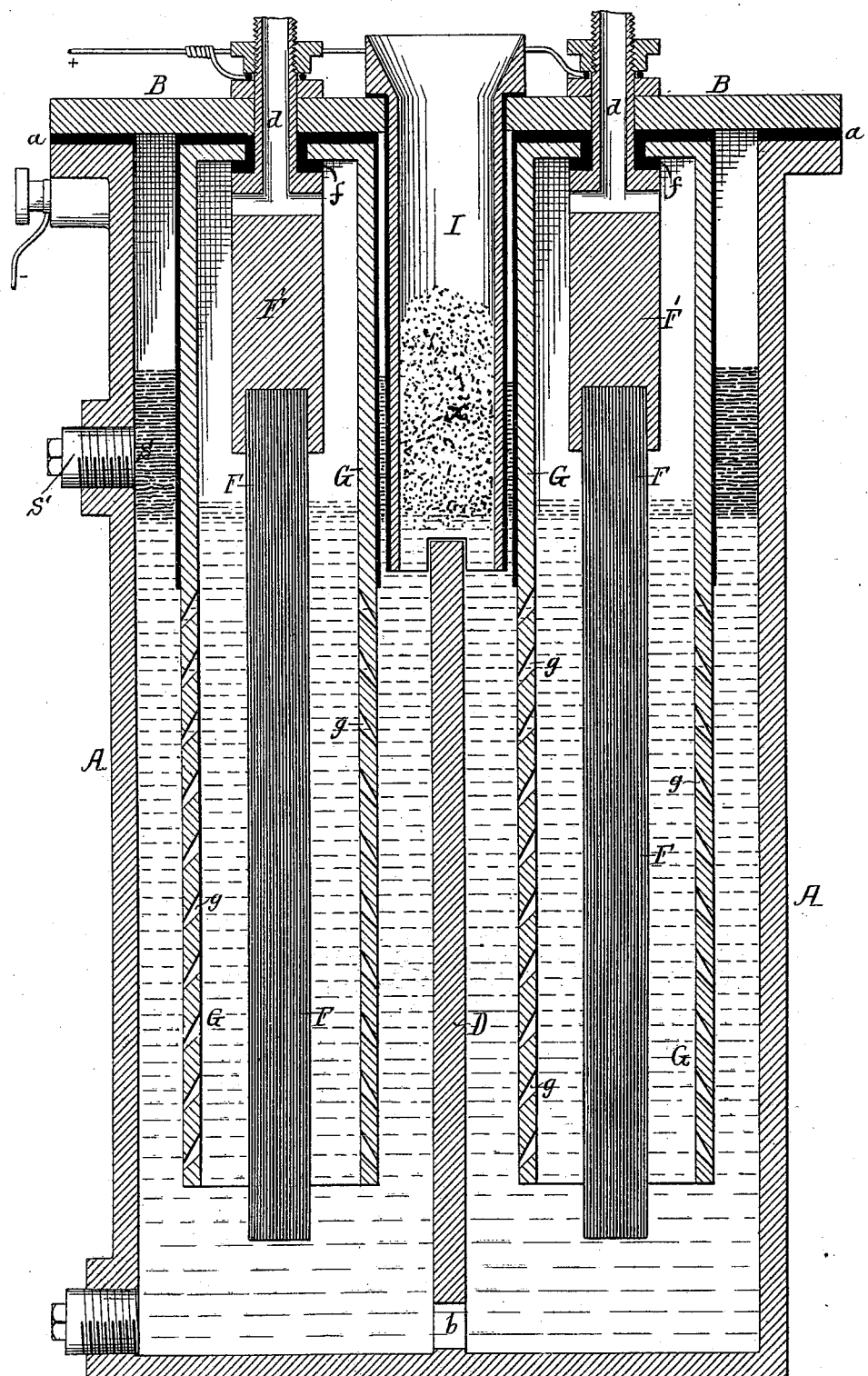
WITNESSES
INVENTOR
James D. Darling
By his Attorneys
Howson & Howson

United States Patent Office.

JAMES D. DARLING, OF PHILADELPHIA, PENNSYLVANIA, ASSIGNOR OF ONE-HALF TO HARRY C. FORREST, OF SAME PLACE.

MODE OF PRODUCING NITRIC ACID AND METALS FROM NITRATES.

SPECIFICATION forming part of Letters Patent No. 517,001, dated March 20, 1894.

Application filed August 21, 1893. Serial No. 483,623. (No specimens.)

*To all whom it may concern:*

Be it known that I, JAMES D. DARLING, a citizen of the United States, residing at Philadelphia, Pennsylvania, have invented certain Improvements in Producing Nitric Acid and Metals from Nitrates, of which the following is a specification.

My invention consists of a novel method of producing nitric acid and metallic sodium or potassium from nitrate of soda or nitrate of potash, the essential of the invention being the electrolyzing of the nitrate while the latter is in a condition of fusion.

The figure in the accompanying drawing represents a double cell for use in carrying out the process.

A is a vessel of any suitable shape and composed of aluminum or other metal, which will not be attacked by fused nitrate of soda or potash, this vessel having a close fitting cover B, which is bolted or otherwise securely confined thereto, but is insulated therefrom by an interposed layer $a$ of insulating material. In the double cell shown in the drawing this vessel is divided into two parts by a central partition D of the same material as the vessel itself, the two compartments, however, being in communication with each other through one or more openings $b$ formed in said partition near the bottom thereof. In each of the compartments of the vessel is a carbon or platinum electrode F carried by a clamp F' which is secured to the cover plate B and has a passage $d$ leading through its upper portion. Surrounding each of these electrodes F is an inverted cup G also composed, by preference, of aluminum, the top of this cup being clamped between the cover plate B and the clamp F', but being insulated from both by means of suitable insulating material $f$. In each cup G is formed a series of openings $g$ inclined upwardly toward the inside of the cup, and passing through the cover plate B is a funnel or hopper I which extends some distance down into the vessel A.

The operation is conducted as follows: The vessel A being filled with the nitrate, say for instance, a nitrate of soda, is subjected to heat until the nitrate is fused, the temperature being, by preference, limited to such an extent that the breaking down of the nitrate of soda and the liberation of oxygen will be prevented for the reason that the liberated oxygen at that temperature would attack the positive electrode very rapidly. When the fusion of the nitrate is completed, the cover plate B, with its electrodes, inverted cups and funnel, is applied to the vessel A and secured in place thereon and a suitable generator of electricity is then connected to the cell, the positive pole being connected to the cover plate and the negative pole to the vessel A. The vessel A thus becomes the negative element of the cell and after the electrical connection is made the degree of heat applied to the vessel A may be moderated as the passage of the current tends to maintain the salt in its fused condition. The nitrate of soda is electrolyzed by the action of the current, Na being liberated at the negative pole and $NO_2+O$ at the positive pole, said $NO_2+O$ escaping through the passage $d$ on each clamp F' and being then led through Woullf bottles containing water, the $NO_2$ forming nitric acid and the O escaping. Sodium is liberated at the negative pole, the first of the sodium so liberated reducing the nitrate of soda present and forming nitrite of soda and sodium oxide, which dissolves in the nitrite of soda. After that, both the nitrite of soda and the sodium oxide are decomposed, the liberated sodium rising to and floating on the top of the fused salts from whence it can be removed at intervals in any available manner, being, for instance, drawn off through a suitably located aperture $s$ closed by a plug $s'$ in the side of the vessel A.

If desired, the nitrate of soda may be first heated to a high temperature so as to drive off as much oxygen as possible and the positive electrodes may then be inserted and the electrolytic action begun, but I prefer the plan before described.

The object of the perforated cups G is to collect the gases evolved at the positive pole and direct them to the hollow clamp F', thus preventing them from spreading through the fused salts and coming into contact and combining with the liberated sodium or potassium.

As the level of the fused salt in the vessel A is lowered by reason of the decomposition of the same, fresh salt $x$ is fed through the funnel I which dips into the fused salt and is thereby sealed in order to prevent the access of air.

Although I have shown in the drawing a double cell, it will be evident that my invention may be carried out in a single cell, or in a cell having any desired number of electrodes.

In some instances the cups may be made of different lengths and when a partial vacuum is maintained in the Woulff bottles the cups may be dispensed with.

Having thus described my invention, I claim and desire to secure by Letters Patent—

The mode herein described of obtaining nitric acid and metallic sodium or potassium from nitrate of soda or potash, said mode consisting in electrolyzing the salt while the same is in a state of fusion in a closed vessel collecting the metallic base at the negative pole leading off from the positive pole the nitrogen per-oxide there formed and converting said nitrogen per-oxide into nitric acid, substantially as described.

In testimony whereof I have signed my name to this specification in the presence of two subscribing witnesses.

JAMES D. DARLING.

Witnesses:
JOSEPH H. KLEIN,
HENRY HOWSON.